United States Patent [19]
Donahoe et al.

[11] Patent Number: 5,757,615
[45] Date of Patent: May 26, 1998

[54] LIQUID COOLED COMPUTER APPARATUS AND ASSOCIATED METHODS

[75] Inventors: Daniel N. Donahoe; Michael T. Gill, both of Spring, Tex.

[73] Assignee: Compaq Computer Corporation, Houston, Tex.

[21] Appl. No.: 674,018

[22] Filed: Jul. 1, 1996

[51] Int. Cl.[6] .................................. G06F 1/20; H05K 7/20
[52] U.S. Cl. ........................ 361/687; 361/699; 361/701; 62/259.2; 165/104.33
[58] Field of Search ........................ 361/687, 689, 361/695, 696, 697, 699, 701, 700, 677, 702, 703, 704, 707, 715; 165/80.4, 104.33; 62/259.2; 257/714, 715; 364/708.1; G06F 1/16, 1/20

[56] References Cited

U.S. PATENT DOCUMENTS

| | | | |
|---|---|---|---|
| 4,997,032 | 3/1991 | Danielson et al. | 165/46 |
| 5,285,347 | 2/1994 | Fox et al. | 361/687 |
| 5,313,362 | 5/1994 | Hatada et al. | 361/709 |
| 5,365,402 | 11/1994 | Hatada et al. | 361/699 |
| 5,381,043 | 1/1995 | Kohiyama et al. | 361/687 |
| 5,383,340 | 1/1995 | Larson et al. | 62/259.2 |
| 5,394,936 | 3/1995 | Budelman | 165/104.33 |
| 5,606,341 | 2/1997 | Aguilera | 345/87 |

OTHER PUBLICATIONS

4465 Byte, "Liquid–Cooled PC's: The Next Hot Thing?", No. 2, Peterborough, NH, Feb. 19, 1994.

Primary Examiner—Lynn D. Feild
Attorney, Agent, or Firm—Konneker & Smith, P.C.

[57] ABSTRACT

A notebook computer is provided and has a base housing in which a heat-generating component is located, and a lid housing pivotally secured to the base housing for pivotal movement relative thereto between open and closed positions. A relatively thin, hollow, flexible heat exchanger has a first section positioned in the base housing in heat exchange contact with the heat-generating component, a second section disposed in the lid housing in heat exchange contact therewith, and a flexible third section through which the interiors of the first and second sections are communicated. During operation of the computer, a small motor-driven pump recirculates a cooling liquid through the heat exchanger in a manner causing heat from the heat-generating component to be transferred to liquid in the first heat exchanger section, be carried therewith through the third section into the second section, and be transferred via the second section to the lid housing portion for dissipation therefrom to ambient. In an alternate embodiment of the heat exchanger a flexible ribbon cable is formed integrally therewith and functions to interconnect the computer motherboard in the base housing to the display circuitry in the lid housing. In an alternate embodiment of the computer, heat from the third heat exchanger section is transferred to an exposed metal heat exchanger block in the computer to permit heat dissipation from the closed computer when it is operatively inserted into a docking station.

21 Claims, 5 Drawing Sheets

LIQUID COOLED COMPUTER APPARATUS AND ASSOCIATED METHODS

BACKGROUND OF THE INVENTION

1. Field of the Invention

The present invention generally relates to computer apparatus and, in a preferred embodiment thereof, more particularly relates to the dissipation of operating heat from computers.

2. Description of Related Art

As small portable computers, such as the increasingly popular notebook computer, have become faster and more powerful their internally generated operating heat needing to be dissipated has correspondingly increased to the extent that adequate heat dissipation has become a major design concern in these more powerful compact computing devices.

The primary heat generating components in notebook computers, such as the processor, power supply, hard drive and the like, are typically disposed in the base housing portion of the computer to which the display screen-carrying lid housing portion is pivotally secured for movement relative thereto between open and closed positions.

Typically, the operating heat generated within the base housing is simply permitted to dissipate through its outer walls to ambient. This approach is, of course, limited by the available area of the outer base housing wall area, and the maximum temperature that such wall area may reach before becoming objectionable to the user. Additionally, since the base housing is generally rested on a generally horizontal support surface during use of the computer, the entire bottom side of the base housing is essentially precluded from dissipating much operating heat to ambient. This can result not only in undesirably high base housing exterior temperatures, but also in excessive internal electronic component temperatures which adversely affect their reliability, longevity and the timing of critical digital component signals.

In another conventional approach, the dissipation of operating heat from these base housing components entails the forced flow of ambient air through the base housing, to transfer operating heat to the air, and the subsequent discharge of the heated air back to ambient. While this approach is generally suitable for its intended purpose with notebook computers in which operating heat generation is relatively low, the age of high speed, high power notebook computers has rapidly diminished the desirability of this forced air heat dissipation approach for several reasons.

For example, due to noise considerations, there is an upper limit to the volumetric flow of cooling air that may be forced through a portable computer base housing of a given interior volume and caused to directly impinge upon the heat generating components therein. When this upper limit is reached so is the limit of the total amount of operating heat that may be sufficiently dissipated in this manner. The total amount of operating heat dissipation may be increased by incorporating various finned-type solid heat exchangers in the interior of the base housing, but this of course takes up space therein that could be used for additional operating components and circuitry. Another problem, of course, is the increased power requirements for the larger capacity cooling fan(s) needed to carry away operating heat from the interior of the notebook computer base housing. Since one of the advantages of a portable notebook computer is that it may be operated on internal battery power, this increased cooling fan power requirement is a less than desirable attribute of the overall computer. Other conventional techniques utilize chassis sheet metal, co-therm pads or heat pipes to drive the base housing to a uniform elevated temperature. However, the efficacy of these cooling techniques is limited by the total external surface area of the base housing.

In view of the foregoing it can readily be seen that it would be highly desirable to provide a portable computer of the type generally described above with improved cooling apparatus and associated methods that eliminate or at least substantially reduce the above mentioned problems, limitations and disadvantages heretofore typically associated with conventional portable computer cooling techniques. It is accordingly an object of the present invention to provide such improved cooling apparatus and associated methods.

SUMMARY OF THE INVENTION

In carrying out principles of the present invention, in accordance with a preferred embodiment thereof, a specially designed liquid cooled electronic apparatus, representatively a notebook computer is provided. The notebook computer includes a base housing having a heat-generating component disposed therein, and a lid housing supported on the base housing for pivotal movement relative thereto between open and closed positions.

According to a key aspect of the present invention, operating heat generated by the heat-generating component within the base housing is dissipated not only through the base housing, as is conventionally done, but is also transferred to and dissipated from the lid housing to ambient. This heat transfer feature uniquely expands the computer housing area from which operating heat is dissipated and, from a broad perspective, is achieved in the present invention by specially designed heat dissipation means incorporated into the computer. Heat dissipation from the lid housing is representatively augmented by external cooling fins disposed on the lid housing.

In a preferred embodiment thereof, the heat dissipation means include a hollow heat exchanger structure, and circulating means. The hollow heat exchanger structure is filled with a cooling liquid and has a first section carried in the base housing in a heat exchange relationship with the heat-generating component, a second section carried in the lid housing in a heat exchange relationship therewith, and a flexible third section interconnecting the first and second heat exchanger structure sections.

The circulating means preferably include a small pump connected to the heat exchanger structure and are operative to circulate the cooling liquid, representatively a 50—50 mix of water and ethylene glycol, through the interior of the hollow heat exchanger structure in a manner causing heat from the heat-generating component to be transferred to liquid in the first section, be carried therewith through the third section into the second section, and then be transferred from the second section to the lid housing for dissipation therefrom to ambient.

In a preferred embodiment thereof, the heat exchanger structure has a relatively thin, sheet-like configuration and is formed from a plurality of sheets of flexible material arranged in a mutually parallel, facing relationship. The aforementioned third section of the heat exchanger structure is preferably extended through the base housing/lid housing hinge juncture are of the computer. In an alternate embodiment of the heat exchanger a flexible ribbon type connector cable is formed integrally therewith and has opposite connector end portions that may be operatively coupled to electronic circuitry in the base and lid housings.

According to another feature of the invention, the base housing has a wall portion spaced apart from the heat-generating component, and the computer further comprises a resilient expanded foam member interposed between the wall portion and the heat-generating component. The first heat exchanger section is interposed and pressed between the resilient member and the heat-generating component.

Another feature of the invention is the provision of a thermally conductive heat sink member portioned against the first heat exchanger section adjacent the heat-generating component, and a fan operative to force air against the heat sink member in a manner utilizing the heat sink member to provide spot cooling of a portion of the liquid disposed within the first heat exchanger section adjacent the heat-generating component.

In an alternate embodiment of the notebook computer the base housing has an external side wall with an opening therein, and the computer further comprises a thermally conductive heat sink member disposed in the base housing in a heat transfer relationship with the hollow heat exchanger. The heat sink member has an exposed portion extending outwardly through the opening in the external side wall.

With this embodiment of the computer in its closed orientation, it may be operatively inserted into a specially designed docking station housing also embodying principles of the present invention. Within the docking station housing is another thermally conductive heat sink member positioned to be engaged by the corresponding computer heat sink member when the closed computer is inserted into the interior of the docking station housing.

A cooling fan disposed within the docking station housing flows cooling air against the docking station heat sink member while cooling liquid is being recirculated through the hollow flexible heat exchanger portion of the computer. Accordingly, heat from the heat-generating component in the computer base housing is sequentially transferred to the first heat exchanger section, carried to the third heat exchanger section, transferred to the docking station heat sink member through the computer heat sink member, and is then dissipated by the cooling fan from the docking station heat sink member.

DETAILED DESCRIPTION

Figure 1:
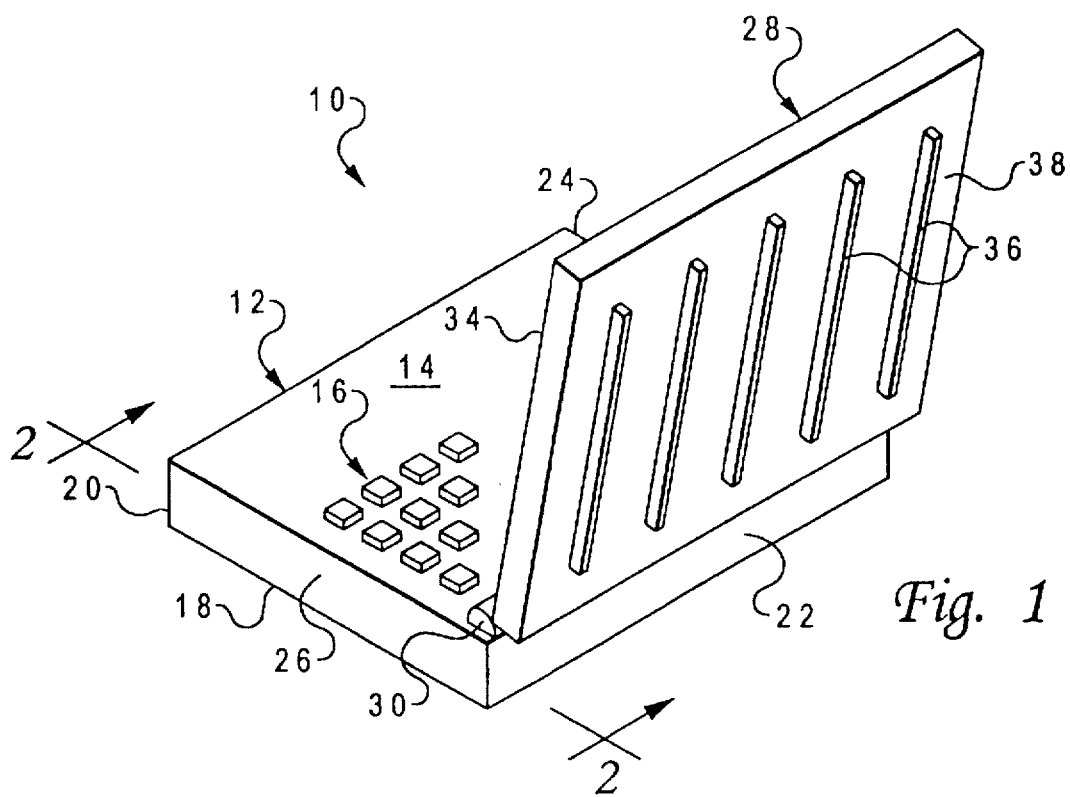
FIG. 1 is a simplified perspective view of a liquid cooled portable notebook computer embodying principles of the present invention.
Figure 2:
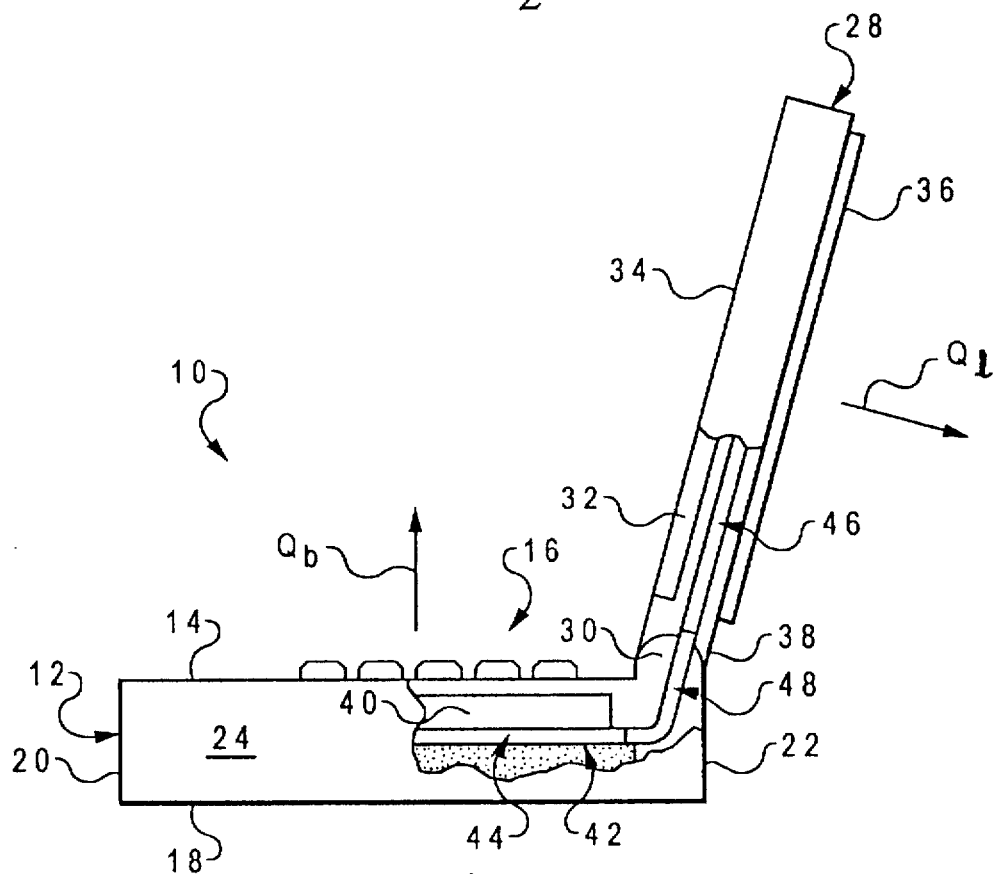
FIG. 2 is a partially cut away side elevational view of the computer taken generally along line 2—2 of FIG. 1.

Referring initially to FIGS. 1 and 2, the present invention provides a specially designed liquid cooled electronic apparatus representatively in the form of a portable notebook computer 10. The notebook computer 10 includes a rectangular hollow plastic base housing 12 having a top side wall 14 with a keyboard assembly 16 operatively supported thereon, a bottom side wall 18, front and rear side walls 20 and 22, and left and right end walls 24 and 26.

A rectangular hollow plastic lid housing 28 is pivotally secured to a hinge juncture area 30 on a rear top side edge portion of the base housing 12 for pivotal movement relative thereto between the illustrated generally upright open position of the lid housing 28, and a closed position in which the lid housing extends across and covers the top side 14 of the base housing 12. Suitably latch means (not shown) are provided for releasably holding the lid housing 28 in its closed orientation. A display screen 32 is operatively disposed on the inner side wall 34 of the lid housing 28, and a spaced series of parallel, elongated cooling fins 36 laterally project outwardly from the outer side wall 38 of the lid housing 28.

Operatively disposed within the interior of the base housing 12 are a variety of operating heat-generating components including the power supply box 40 schematically illustrated in FIG. 2. According to a key feature of the present invention, a specially designed liquid filled heat exchanger structure 42 is utilized to receive a substantial amount of operating heat $Q_1$ from these components and transfer such operating heat to the lid housing 36 for dissipation therefrom to ambient as illustrated. This operating heat $Q_1$ is in addition to the operating heat $Q_b$ dissipated to ambient from the base housing 12, with the transfer to ambient of the substantial operating heat portion $Q_1$ being representatively enhanced by the lid fins 36.

As can readily be seen, in the notebook computer 10 this unique addition of the lid housing 28 as a substantial dissipation source for operating heat generated in the base housing 12 greatly increases the overall housing surface area from which operating heat is rejected. This, in turn, substantially reduces the operating temperature of the base housing walls for a given heat generation level in the interior of the base housing. Alternatively, this base-to-lid heat transfer technique of the present invention permits greater operating heat to be generated within the base housing without causing the external surface temperature of the computer to exceed a predetermined design magnitude.

Figure 3:
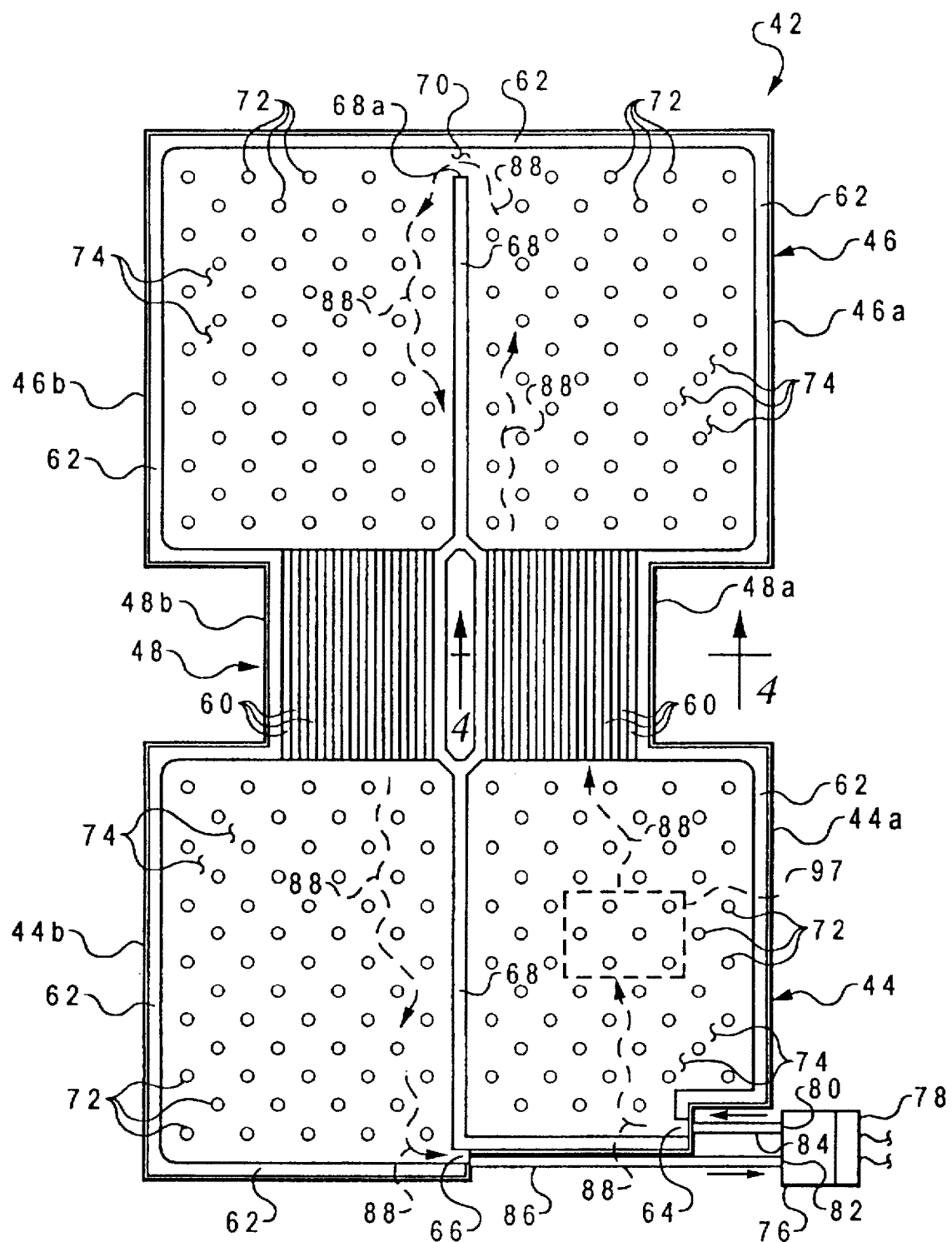
FIG. 3 is a top plan view of a specially designed flexible liquid heat exchanger structure embodying principles of the present invention and use to dissipate internal operating heat from the computer.
Figure 4:
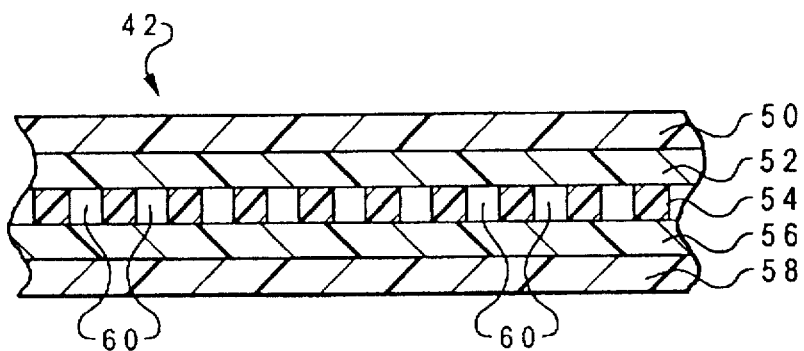
FIG. 4 is an enlarged scale partial cross-sectional view through the liquid heat exchanger structure taken along line 4—4 of FIG. 3.

Turning now to FIGS. 3 and 4, the heat exchanger structure 42 is of a hollow, relatively thin, flexible sheet-like configuration and is filled with a coolant liquid, representatively a mixture of fifty percent water and fifty percent ethylene glycol. In the illustrated embodiment thereof, the liquid heat exchanger structure 42 has a generally rectangular base section 44, and a generally rectangular lid section 46 spaced apart therefrom. The base and lid sections 44,46 are connected to one another by, and their interiors communicated through, a joining section 48 defined by two generally rectangular, separated portions 48a and 48b.

As cross-sectionally illustrated in FIG. 4, the flexible body portion of the heat exchanger structure 42 just described is representatively of a laminated construction defined, from top to bottom in FIG. 4, by five sheets of flexible material 50,52,54,56 and 58 that are thermally bonded to one another. Layers 50,54 and 58 are of a polyimide film material, representatively a material manufactured by the DuPont Company under the tradename "KAPTON", and layers 52 and 54 are of an FEP fluorocarbon film material, representatively a material manufactured by the DuPont Company under the tradename "TEFLON".

The central flexible sheet 54 is chemically etched or otherwise processed to form therein various passages within the interior of the flexible heat exchanger 42 such as the elongated parallel passages 60 extending through the joining sections 48a, 48b and communicating the interiors of the heat exchanger base and lid sections 44 and 46. The five flexible sheets 50,52,54,56,58 are bonded together around the periphery of the heat exchanger 42 to form a peripheral seal 62 which is broken only at an inlet opening 64, and an outlet opening 66, along the bottom side of the heat exchanger base section 44 as viewed in FIG. 3.

Additionally, the five flexible sheets 50,52,54,56,58 are bonded together to form a center seal portion 68 that (as viewed in FIG. 3) extends upwardly from the outlet opening 66, through a horizontally central portion of the joining section 48, and upwardly through a central portion of the lid section 46. The center seal 68, as viewed in FIG. 3, horizontally divides the heat exchanger base section 44 into first and second portions 44a and 44b, and horizontally divides the lid section into first and second portions 46a and 46b. The upper end 68a of the center seal 68 is downwardly offset from the top side of the peripheral seal 62 and defines therewith an interior heat exchanger passage 70 through which the interiors of the first and second lid section portions 46a, 46b communicate with one another.

As further illustrated in FIG. 3, the interiors of the heat exchanger base and lid portions 44a, 44b, 46a and 46b are basically open, but have disposed therein staggered series of mutually spaced, representatively round interbonded sections 72 of the five flexible body layers 50,52,54,56,68. These sections 72 form in their associated heat exchanger portions 44a, 44b, 46a, 46b generally labyrinth-like passageways 74 between the sections 72. Representatively, the sections 72 are shown as being in a uniformly spaced apart relationship. However, if desired, the flow through various predetermined portions of the heat exchanger base and lid portions may be concentrated, to provide such portions with increased heat absorbing capacity, by appropriately changing the flow restriction patterning of the sections 72.

A small liquid recirculating pump 76 having an integral electric drive motor 78 has an outlet 80 and an inlet 82. A flexible supply conduit 84 is sealingly connected at its opposite ends to the pump outlet 80 and the heat exchanger inlet opening 64, and a flexible return conduit 86 is sealingly connected at its opposite ends to the pump inlet 82 and the heat exchanger outlet opening 66. Pump 76 may be a single speed of multiple speed pump depending on the degree of cooling control desired. During operation of the pump 76 the liquid coolant 88 is continuously recirculated through the heat exchanger 42 sequentially via the supply conduit 84, the base section portion 44a, the joining section portion 48a, the lid section portion 46a, the lid section portion 46b, the joining section portion 48b, and base section 44b, and the return conduit 86.

Figure 5:
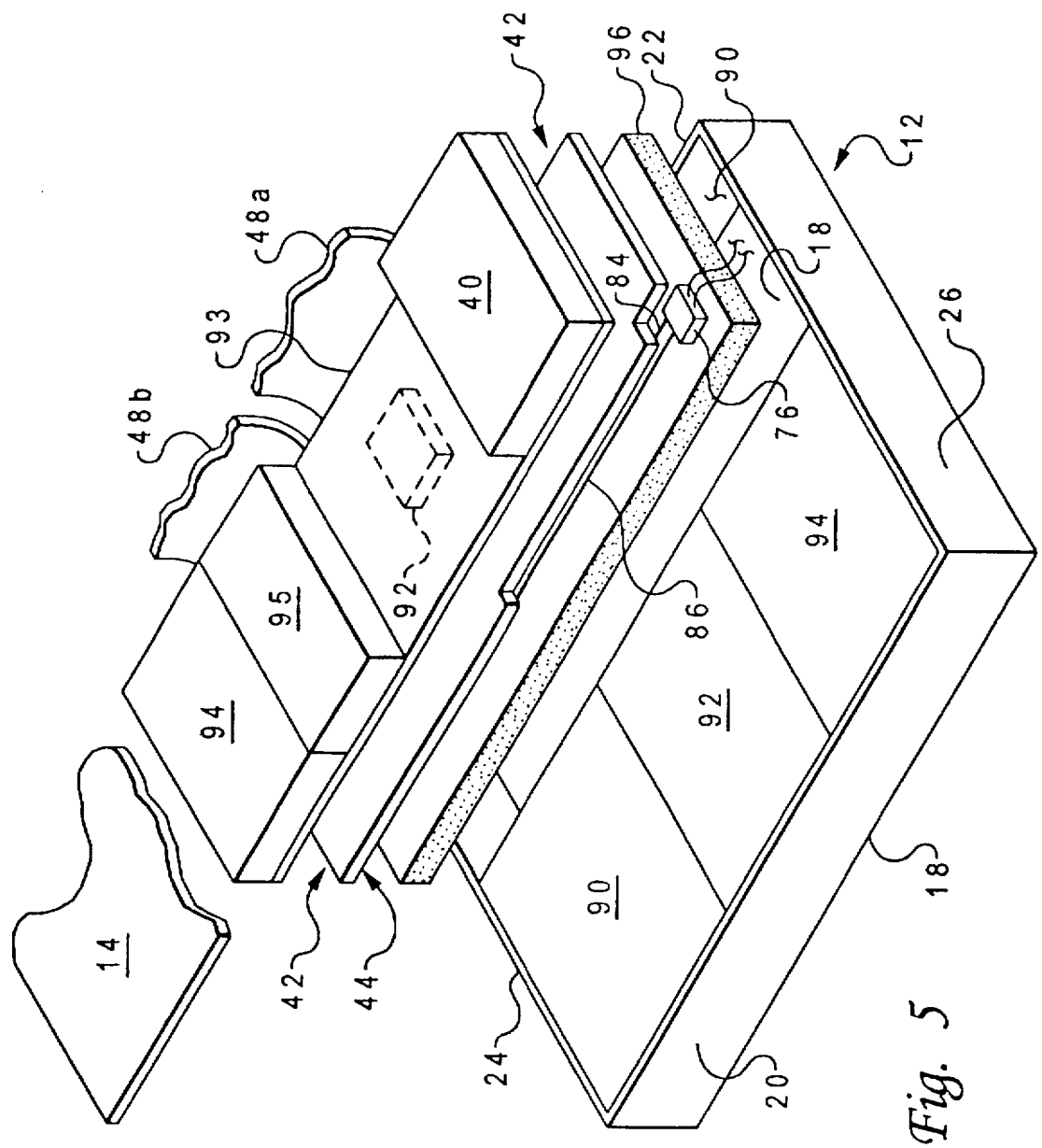
FIG. 5 is an enlarged scale partially exploded view of a base housing portion of the notebook computer.

FIG. 5 schematically illustrates a representative assemblage of components operatively disposed in the interior of the computer base housing 12. For the purpose of illustration these components have been grouped into relatively low heat generating components, and relatively high heat generating components. The relatively low heat generating components include, from left to right in FIG. 5, a CD drive 90, a floppy disc drive 92, and a battery 94—all disposed within a front interior side portion of the base housing 12.

The relatively high heat generating components are received in a rear interior side portion 90 of the base housing 12 and include the previously mentioned power supply box 40, a high speed processor 92 mounted on the underside of a motherboard 93, a PCMCIA drive 94, and a hard drive 95. As illustrated in exploded form in FIG. 5, a generally rectangular expanded resilient foam cushioning member 96 is complementarily received in a bottom portion of the base housing interior space 90 and rests on the bottom base housing side wall 18 and directly underlies the heat exchanger base section 44.

The bottom side of the motherboard 93 and its associated processor 92 are pressed against the upper side of the heat exchanger base section 44 which, in turn, is cushioned by the underlying foam member 96. The high heat generating components 40, 94 and 95 are sandwiched as shown between the top side of the motherboard 94 and the underside of the top base housing side wall 14.

Referring again to FIG. 2, during operation of the computer 10, operating heat from the above-mentioned high heat generating components 40,92,93,94,95 is transferred to liquid coolant 88 being forced through the heat exchanger base section 44. This operating heat is carried by such liquid coolant through the heat exchanger joining section 48 (which is suitably extended through the hinge structure 30) into the heat exchanger lid section 46 which is disposed in a suitable heat exchange relationship with the outer side wall 38 of the lid housing 28. This transferred heat ($Q_1$) is then dissipated to ambient through the lid housing 28. Due to the flexible nature of the heat exchanger joining section 48 it conveniently bends when the lid housing 28 is pivoted downwardly to its closed orientation (see, e.g., FIG. 9 which will be subsequently discussed herein).

As illustrated in FIG. 3, a small sheet 97 of thermally conductive metallic cladding material (preferably copper) may be suitably adhered to the top side of, for example, the heat exchanger section 44a and positioned to underlie and engage a particularly heat prone computer component within the base housing. The metallic cladding sheet 97 is preferably made somewhat larger than the footprint of the heat generating component which it underlies. In this manner, heat transfer from the component to the liquid coolant beneath the sheet 97 may be substantially enhanced.

As will readily be appreciated by those skilled in this particular art, the FIG. 5 arrangement of components within the base housing 12, the particular shape of the heat exchanger 42, and the configuration of the various liquid coolant flow paths within the interior of the heat exchanger 42 are merely representative of the wide variety of component arrangements, flow path configurations and heat exchanger shaped and constructions that may be alternatively utilized without departing from principles of the present invention.

Figure 6:
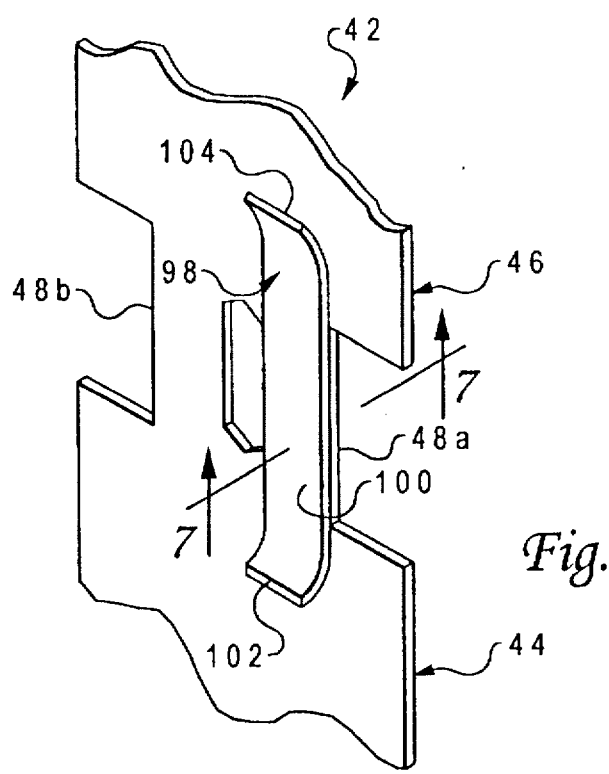
FIG. 6 is a simplified perspective view of a portion of an alternate embodiment of the flexible liquid heat exchanger structure.
Figure 7:
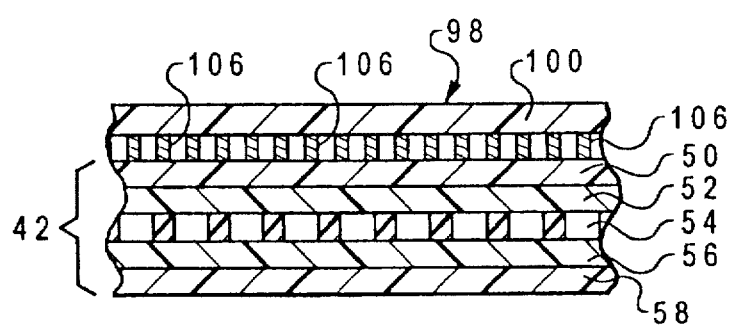
FIG. 7 is an enlarged scale partial cross-sectional view through the alternate heat exchanger embodiment taken generally along line 7—7 of FIG. 6.

Referring now to FIGS. 6 and 7, according to another aspect of the present invention a flexible ribbon type interconnect cable 98 is integrally formed with the liquid heat exchanger 42, the cable 98 having an elongated rectangular flexible plastic body 100 with opposite connector end portions 102 and 104, and spaced apart electrically conductive metal traces 106 (see FIG. 7) disposed on one side of the body 100 and operatively coupled to similar traces on the connector end portions 102,104. In integrally incorporating the ribbon connector cable 98 with the heat exchanger 42, the traces 106 are formed on, for example, the outer side surface of the layer 50 of the joining section portion 48a (see FIG. 7), and a side surface of the ribbon cable body portion 100 is suitably secured to the traces 106 with the connector ends 102,104 being unattached to the heat exchanger 42 and free to be bent outwardly and inwardly relative thereto.

When the heat exchanger 42 is installed within the computer 10 as previously described, the ribbon cable body 100 is simply bent with the heat exchanger joining section 48 when the lid housing is opened and closed, and the ribbon cable connector end portions 102 are respectively plugged into the motherboard 94 within the base housing 12 and the display circuitry (not shown) within the lid housing 28.

Figure 8:
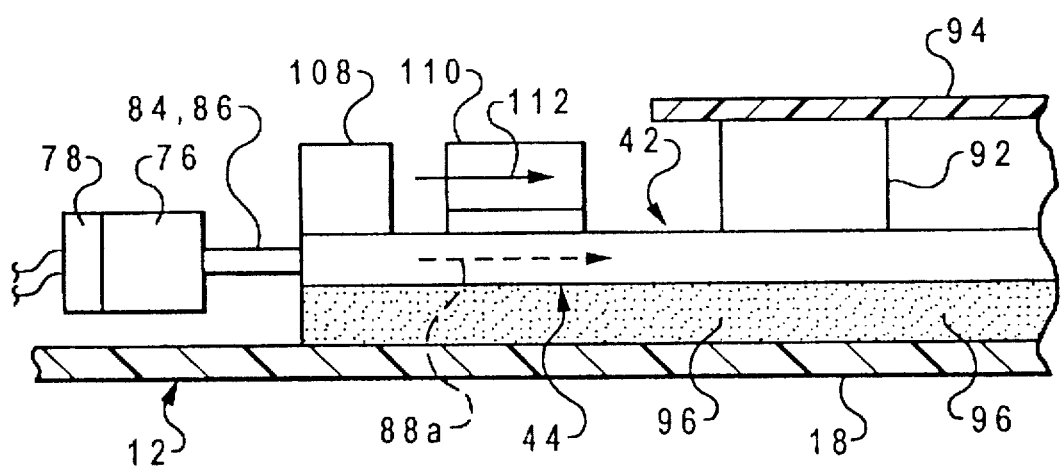
FIG. 8 is a schematic cross-sectional view through the computer and illustrates a supplemental spot cooling feature of the invention incorporated in the computer.

Turning now to FIG. 8, according to another feature of the present invention the heat dissipation function of the flexible liquid heat exchanger 42 is augmented in an alternate embodiment of the invention, to provide increased "spot" cooling of a particularly heat prone operating component (such as the processor 92), by providing a small cooling fan 108 and a finned heat exchanger 110. The heat exchanger is suitably positioned against the heat exchanger base section 44 adjacent the processor 92, and the fan 108 is used to flow a continuous stream of cooling air 112 across the finned heat exchanger 110. In this manner a portion 88a of the recirculating liquid coolant 88 directly beneath the finned heat exchanger 110 is subcooled (i.e., brought to a temperature closer to that of the surrounding ambient air) to thereby increase the heat transfer from the processor 92 to its underlying portion of the heat exchanger base section 44.

Figure 9:
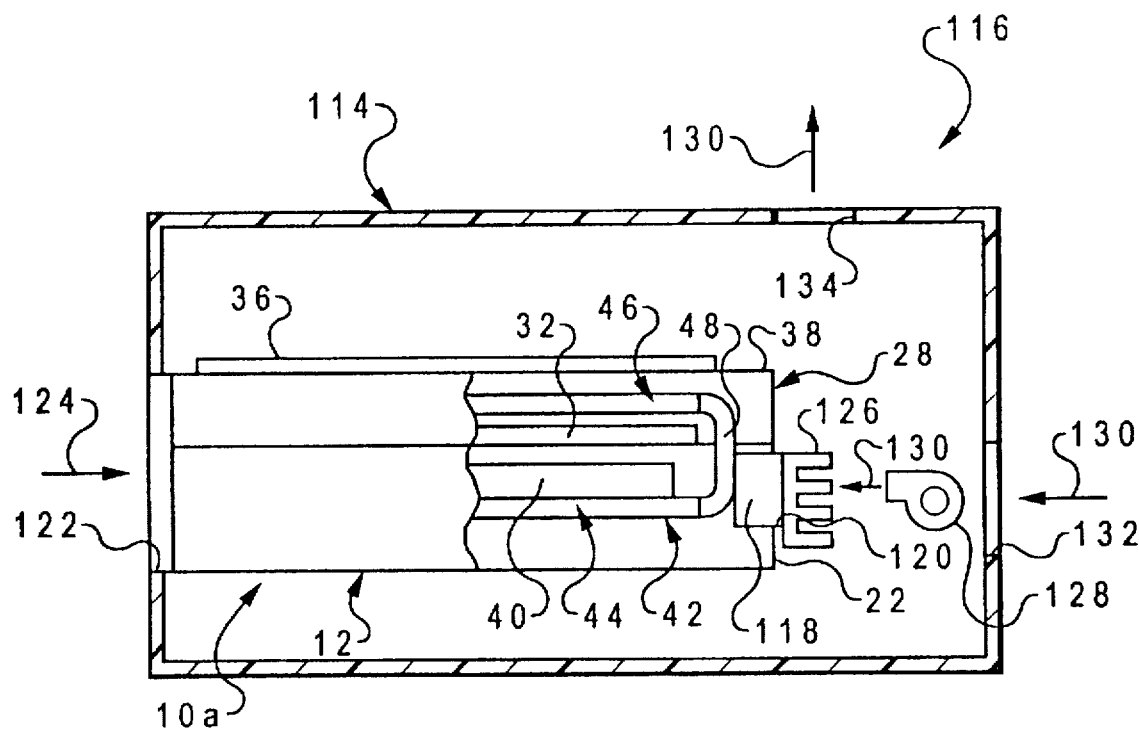
FIG. 9 is a highly schematic cross-sectional view through a docking station structure into which an alternate embodiment of the notebook computer has been operatively inserted.

In FIG. 9 an alternate embodiment 10a of the previously described notebook computer 10 is illustrated in simplified form in its closed orientation and operatively inserted into the housing 114 of a docking station 116 that serves, in a generally conventional manner, to couple the internal electronic circuitry of the computer 10a to desktop peripheral devices (not shown) such as a keyboard, mouse, printer and monitor.

Notebook computer 10a is substantially identical to the previously described notebook computer 10 with the exception that the computer 10a has a metal heat transfer block 118 mounted in a rear interior side portion of its base housing 12 and projecting outwardly through an opening 120 in the rear base housing side wall 22. As illustrated, with the lid housing 28 of the computer 10a in its downwardly pivoted closed orientation, the joining section 48 is in heat transfer contact with an inner side surface portion of the block 118.

When the closed notebook computer 10a is rearwardly inserted through the docking station housing opening 122 into the interior of the housing 114, as indicated by the arrow 124 in FIG. 9, an exposed outer or right side surface portion of the heat transfer block 118 is brought into contact with a finned metal heat sink member 126 suitably supported within the interior of the docking station housing 114.

During operation of the computer 10a within the docking station housing 114, heat generated by the interior base housing components (such as the power supply box schematically depicted in FIG. 9) is transferred to liquid coolant being circulated through the base section 44 of the heat exchanger 42 and into the heat exchanger joining section 48. Operating heat from the liquid coolant within the joining section 48 is conducted through the block 118 into the finned heat sink 126 and dissipated by a cooling fan 128 internally mounted within the docking station housing 114 and operative to sequentially flow ambient air 130 into a housing inlet opening 132, against the finned heat sink member 126, and then outwardly through a housing outlet opening 134. If desired, the block 118 and its associated opening 120 may be disposed on a rear underside portion of the base housing, and the heat sink 126 and fan 128 correspondingly relocated within the housing 114 as necessary.

In this manner, the liquid cooling system disposed within the computer 10a facilitates enhanced operating heat dissipation when the computer 10a is used in its open orientation outside of the docking station 116 or, as just described, with the computer 10a in its closed orientation within the docking station.

The foregoing detailed description is to be clearly understood as being given by way of illustration and example only, the spirit and scope of the present invention being limited solely by the appended claims.

What is claimed is:

1. Electronic apparatus comprising:

a base housing having a heat-generating component disposed therein;

a lid housing supported on said base housing for movement relative thereto between open and closed positions; and single phase, liquid-based heat dissipation means for dissipating operating heat generated by said heat-generating component, said heat dissipation means including:

a hollow heat exchanger structure essentially entirely filled with a liquid and having a first section carried in said base housing in a heat exchange relationship with said heat-generating component, a second section carried in said lid housing in a heat exchange relationship therewith, and a flexible third section interconnecting said first and second sections, and circulating means for circulating the liquid through the interior of said hollow heat exchanger structure in a manner causing heat from said heat-generating component to be transferred to liquid in said first section, be carried by the liquid through said third section into said second section, and then be transferred from the liquid in said second section to said lid housing for dissipation therefrom to ambient, said hollow heat exchanger structure having a relatively thin, sheet-like configuration and being formed from a plurality of sheets of flexible material arranged in a mutually parallel, facing relationship, said hollow heat exchanger structure further having an inlet opening and an outlet opening, and said circulating means including a pump having an inlet communicated with said outlet opening, and an outlet communicated with said inlet opening.

2. The electronic apparatus of claim 1 wherein:

said electronic apparatus is a portable computer.

3. The electronic apparatus of claim 2 wherein:

said portable computer is a notebook computer.

4. The electronic apparatus of claim 1 wherein:

said inlet opening and said outlet opening are formed in said first section of said hollow heat exchanger structure.

5. The electronic apparatus of claim 4 wherein:

said pump is disposed in said base housing.

6. The electronic apparatus of claim 1 wherein:

said liquid is a mixture of water and ethylene glycol.

7. The electronic apparatus of claim 6 wherein:

said liquid is a mixture of about fifty percent by volume of water, and about fifty percent by volume of ethylene glycol.

8. The electronic apparatus of claim 1 wherein:

said base housing has a wall portion spaced apart from said heat-generating component, said electronic apparatus further comprises a resilient member interposed between said wall portion and said heat generating component, and said first heat exchanger section is interposed and pressed between said resilient member and said heat-generating component.

9. The electronic apparatus of claim 8 wherein:

said resilient member is a sheet of expanded resilient foam material.

10. The electronic apparatus of claim 1 further comprising:

a thermally conductive heat sink member positioned against said first heat exchanger section adjacent said heat-generating component, and a fan operative to force air against said heat sink member in a manner utilizing said heat sink member to provide spot cooling of a portion of said liquid disposed within said first heat exchanger section adjacent said heat-generating component.

11. The electronic apparatus of claim 1 wherein:

said lid housing has an outer side surface, and said electronic apparatus further comprises cooling fins disposed on and projecting outwardly from said outer side surface, said cooling fins being operative to enhance heat dissipation from said lid housing to ambient.

12. The electronic apparatus of claim 1 wherein:

said base housing and said lid housing are pivotally interconnected at a hinged juncture area of said electronic apparatus, and said third section of said hollow heat exchanger structure extends through said hinged juncture area.

13. The electronic apparatus of claim 1 wherein:

said base housing has an external side wall with an opening therein, and said electronic apparatus further comprises a thermally conductive heat sink member disposed in one of said base housing and said lid housing in a heat transfer relationship with said hollow heat exchanger, said heat sink member having an exposed portion extending outwardly through said opening in said external side wall of said base housing.

14. Electronic apparatus comprising:

a base housing having a heat-generating component disposed therein;

a lid housing supported on said base housing for movement relative thereto between open and closed positions; and heat dissipation means for dissipating operating heat generated by said heat-generating component, said heat dissipation means including:

a hollow heat exchanger structure filled with a liquid and having a first section carried in said base housing in a heat exchange relationship with said heat-generating component, a second section carried in said lid housing in a heat exchange relationship therewith, and a flexible third section interconnecting said first and second sections, and circulating means for circulating the liquid through the interior of said hollow heat exchanger structure in a manner causing heat from said heat-generating component to be transferred to liquid in said first section, be carried therewith through said third section into said second section, and then be transferred from said second section to said lid housing for dissipation therefrom to ambient, said hollow heat exchanger structure having an inlet opening and an outlet opening formed in said first section of said hollow heat exchanger structure, and said circulating means including a pump having an inlet communicated with said outlet opening, and an outlet communicated with said inlet opening, said circulating means further including internal wall means disposed in the interior of said hollow heat exchanger structure and being operative to direct liquid discharged from said pump outlet into said inlet opening of said hollow heat exchanger structure sequentially through a first portion of said first section, a first portion of said third section, a first portion of said second section, a second portion of said second section, a second portion of said third section, a second portion of said first section, and then outwardly through said outlet opening of said hollow heat structure into said inlet of said pump.

15. Electronic apparatus comprising:

a base housing having a heat-generating component disposed therein;

a lid housing supported on said base housing for movement relative thereto between open and closed positions;

heat dissipation means for dissipating operating heat generated by said heat-generating component, said heat dissipation means including:

a hollow heat exchanger structure filled with a liquid and having a first section carried in said base housing in a heat exchange relationship with said heat-generating component, a second section carried in said lid housing in a heat exchange relationship therewith, and a flexible third section interconnecting said first and second sections, and circulating means for circulating the liquid through the interior of said hollow heat exchanger structure in a manner causing heat from said heat-generating component to be transferred to liquid in said first section, be carried therewith through said third section into said second section, and then be transferred from said second section to said lid housing for dissipation therefrom to ambient; and a flexible ribbon type cable connector structure formed integrally with said flexible third section of said hollow heat exchanger and having first and second opposite connector end portions respectable connectable to circuitry in said base housing and said lid housing.

16. The electronic apparatus of claim 15 wherein:

said third heat exchanger section has an exterior side surface area, and said flexible ribbon type cable connector structure includes a spaced series of metal traces formed on said exterior side surface area, and a relatively thin elongated flexible body portion having a longitudinally intermediate outer side portion affixed to said traces.

17. Electronic apparatus comprising:

a base housing having a heat-generating component disposed therein;

a lid housing supported on said base housing for movement relative thereto between open and closed positions; and heat dissipation means for dissipating operating heat generated by said heat-generating component, said heat dissipation means including:

a hollow heat exchanger structure filled with a liquid and having a first section carried in said base housing in a heat exchange relationship with said heat-generating component, a second section carried in said lid housing in a heat exchange relationship therewith, and a flexible third section interconnecting said first and second sections, and circulating means for circulating the liquid through the interior of said hollow heat exchanger structure in a manner causing heat from said heat-generating component to be transferred to liquid in said first section, be carried therewith through said third section into said second section, and then be transferred from said second section to said lid housing for dissipation therefrom to ambient, said hollow heat exchanger structure having a relatively thin, sheet-like configuration and being formed from a plurality of sheets of flexible material arranged in a mutually parallel, facing relationship, said plurality of sheets of flexible material being of a nonmetallic construction, and said hollow heat exchanger structure further having an outer side surface portion with a sheet of a heat conductive metallic cladding material disposed thereon.

18. Electronic apparatus comprising:

a first housing having a heat-generating component disposed therein;

a second housing secured to said first housing for pivotal movement relative thereto between open and closed positions; and single phase, liquid-based heat dissipation means operative to:

(1) recirculate a cooling liquid between the interiors of said first and second housings, (2) transfer heat from said heat-generating component to a portion of cooling liquid within said first housing, and (3) cause the transferred heat to be carried with the cooling liquid portion into said second housing and placed in a heat exchange relationship with said second housing for dissipation therefrom to ambient, said heat dissipation means including a hollow, flexible heat exchanger essentially entirely filled with a liquid coolant and having an inlet opening and an outlet opening, a first section disposed within said first housing, a second section disposed within said second housing, and a joining section disposed between said first and second sections and communicating their interiors, and a pump having an outlet communicated with said heat exchanger inlet opening, and an inlet communicated with said heat exchanger outlet opening, said pump being operative to flow the liquid within said heat exchanger sequentially from said first section, through said joining section into said second section, and then back into said first section.

19. The electronic apparatus of claim 18 wherein:

said electronic apparatus is a portable computer.

20. The electronic apparatus of claim 19 wherein:

said portable computer is a notebook computer.

21. Computer apparatus comprising:

a docking station structure including:

a housing having a front wall section with an insertion opening therein, a first heat sink member disposed in the interior of said housing in a rearwardly spaced relationship with said insertion opening, and a fan operative to flow cooling air against said first heat sink member; and a portable computer including:

a base housing having a heat-generating component disposed therein, and an exterior side wall portion, said exterior side wall portion having an opening therein, a lid housing pivotally secured to said base housing for pivotal movement relative thereto between open and closed positions, a second heat sink member disposed within said base housing and having a portion extending outwardly through said exterior side wall portion opening in said base housing, a liquid filled flexible heat exchanger having a first section disposed within said base housing in a heat transfer relationship with said heat-generating component, a second section disposed in said lid housing in a heat transfer relationship therewith, and a third section interconnected between said first and second sections and communicating their interiors, said third section being in a heat transfer relationship with said second heat sink member, and a pump connected to said heat exchanger and operative to recirculate the liquid therein between said first and second sections via said third section, said portable computer, with said lid housing closed, being rearwardly insertable through said insertion opening into the interior of said housing in a manner bringing said portion of said second heat sink member into contact with said first heat sink member.

* * * * *